(12) United States Patent
Kumagawa et al.

(10) Patent No.: US 6,582,650 B1
(45) Date of Patent: Jun. 24, 2003

(54) ORGANIC SILICON POLYMER, INORGANIC FIBER WITH SILICON CARBIDE BASE, AND METHOD OF MANUFACTURE THEREOF

(75) Inventors: Kiyoshi Kumagawa, Ube (JP); Masaki Shibuya, Ube (JP); Michiyuki Suzuki, Ube (JP); Hiroyuki Yamaoka, Ube (JP)

(73) Assignee: Ube Industries, Ltd., Yamaguchi-ken (JP)

( * ) Notice: Subject to any disclaimer, the term of this patent is extended or adjusted under 35 U.S.C. 154(b) by 0 days.

(21) Appl. No.: 09/889,794

(22) PCT Filed: Nov. 21, 2000

(86) PCT No.: PCT/JP00/08200

§ 371 (c)(1),
(2), (4) Date: Jul. 20, 2001

(87) PCT Pub. No.: WO01/38616

PCT Pub. Date: May 31, 2001

(30) Foreign Application Priority Data

Nov. 24, 1999 (JP) ............................................. 11-332468
Jan. 25, 2000 (JP) ........................................ 2000-015716
Jan. 25, 2000 (JP) ........................................ 2000-015717

(51) Int. Cl.$^7$ ................................................. D01D 5/00
(52) U.S. Cl. ..................... 264/603; 501/88; 501/95.1; 524/430; 524/432; 524/433; 524/493; 524/847; 524/588
(58) Field of Search .................. 501/88, 95.1; 524/430, 524/432, 433, 493, 847, 588; 264/603

(56) References Cited

U.S. PATENT DOCUMENTS 4,515,742 A    5/1985  Yajima et al.
4,770,935 A  * 9/1988  Yamamura et al.
5,008,317 A  * 4/1991  Wolfer et al.

FOREIGN PATENT DOCUMENTS

| EP | 246104    | 11/1987 |
| EP | 0 519 496 | 12/1992 |
| EP | 826647    | 3/1998  |
| JP | 57-165452 | 10/1982 |
| JP | 6-1847    | 1/1994  |
| JP | 7-157663  | 6/1995  |
| JP | 10 053924 | 2/1998  |

OTHER PUBLICATIONS

Hawley, The condensed chemical dictionary, 8$^{th}$ Ed., Van Nostrand Reinhold, 1971, pp. 37, 109, 536, 951 and 956.*

Database WPI, Derwent Publications, AN 1998–201867, Abstract of JP 10 053924, Feb. 24, 1998.

* cited by examiner

Primary Examiner—Robert Dawson
Assistant Examiner—Kuo-Liang Peng
(74) Attorney, Agent, or Firm—Wenderoth, Lind & Ponack, L.L.P.

(57) ABSTRACT

An oxide-containing organosilicon polymer containing 1 to 45% by weight of metal oxide particles, an oxide-containing silicon-carbide-based inorganic fiber obtained by using the above organosilicon polymer as a raw material and having excellent oxidation resistance, in particular excellent oxidation resistance in a high temperature oxidizing atmosphere containing moisture, a crystalline silicon-carbide-based inorganic fiber having a calcined structure of SiC and production processes of these.

8 Claims, 3 Drawing Sheets

ORGANIC SILICON POLYMER, INORGANIC FIBER WITH SILICON CARBIDE BASE, AND METHOD OF MANUFACTURE THEREOF

TECHNICAL FIELD

The present invention relates to an oxide-containing silicon-carbide-based inorganic fiber or a crystalline silicon-carbide-based inorganic fiber which is excellent in oxidation resistance at high temperatures, in particular at high temperatures in an atmosphere containing moisture, and the production processes of these. Further, the present invention relates to an oxide-containing organosilicon polymer used as a raw material for producing the above silicon-carbide-based inorganic fiber, etc., and its production process.

BACKGROUND OF THE INVENTION

A silicon-carbide-based fiber is used as a fibrous reinforcement for plastics or ceramics owing to its excellent heat resistance and mechanical properties. And, many proposals have been already made with regard to silicon-carbide-based inorganic fibers and the process for the production thereof.

For example, JP-B-58-38535 discloses a process for producing a silicon carbide fiber, which comprises spinning an organosilicon polymer having a chain formed of silicon and carbon as main components, heating the spun fiber at a low temperature in an oxidizing atmosphere to form an infusible fiber and calcining the formed infusible fiber at a high temperature.

Further, JP-B-62-52051 discloses a silicon-carbide-based inorganic fiber composed of silicon-carbon-titanium-oxygen, and JP-B-58-5286 discloses a process for producing the above silicon-carbide-based inorganic fiber composed of silicaon-carbon-titanium-oxygen, which comprises spinning a polytitanocarbosilane obtained by bonding part of silicon atoms of a polycarbosilane to titanium atoms through an oxygen atom, infusibilizing the spun fiber and calcining the infusibilized fiber.

In recent years, as typified by ceramics reinforced with an inorganic fiber, a composite material reinforced with an inorganic fiber is required to endure being used in severer environments. Therefore it is desired to increase an inorganic fiber as a reinforcing material in heat durability under an oxidizing atmosphere, in particular under an atmosphere containing moisture.

It is an object of the present invention to provide an oxide-containing silicon-carbide-based inorganic fiber or a crystalline silicon-carbide-based inorganic fiber which is excellent in oxidation resistance, in particular in an oxidizing atmosphere containing moisture at high temperatures, as compared with the silicon-carbide-based inorganic fibers disclosed in the above publications, an oxide-containing organosilicon polymer used as a raw material for producing the above fibers, and the production processes of these.

DISCLOSURE OF THE INVENTION

According to the present invention, there is provided an oxide-containing organosilicon polymer which is characterized by containing 1 to 45% by weight of metal oxide particles.

According to the present invention, further, there are provided an oxide-containing silicon-carbide-based inorganic fiber which is characterized by containing 1 to 45% by weight of metal oxide particles and a silicon-carbide-based inorganic fiber in which the content ratio of the metal oxide in a region close to the surface of the fiber is higher than the content of the metal oxide in the inside of the fiber.

According to the present invention, further, there is provided a production process of an oxide-containing organosilicon polymer, which process comprises adding an alcohol solution of a metal oxide sol to an organosilicon polymer and heat-treating the mixture in an inert gas atmosphere.

According to the present invention, further, there is provided a production process of an oxide-containing silicon-carbide-based inorganic fiber, which process comprises adding an alcohol solution of a metal oxide sol to an organosilicon polymer, heat-treating the mixture in an inert gas atmosphere to obtain an oxide-containing organosilicon polymer, melt-spinning the oxide-containing organosilicon polymer to form a spun fiber, infusibilizing the spun fiber to obtain an infusible fiber, and calcining the infusible fiber under heat.

According to the present invention, further, there is provided a crystalline silicon-carbide-based inorganic fiber containing 1 to 45% by weight of a metal oxide and having a calcined structure of SiC.

According to the present invention, further, there is provided a production process of a crystalline silicon-carbide-based inorganic fiber containing 1 to 45% by weight of a metal oxide and having a calcined structure of SiC, which process comprises adding an alcohol solution of a metal oxide sol to an organosilicon polymer, heat-treating the mixture in an inert gas atmosphere to obtain an oxide-containing organosilicon polymer, spinning the oxide-containing organosilicon polymer to form a spun fiber, infusibilizing the spun fiber to obtain an infusible fiber, calcining the infusible fiber under heat to obtain an oxide-containing silicon-carbide-based inorganic fiber, and heat-treating the oxide-containing silicon-carbide-based inorganic fiber at a temperature of from 1,600 to 2,100° C. in an inert gas.

MOST PREFERRED EMBODIMENT OF THE INVENTION

Figure 1:
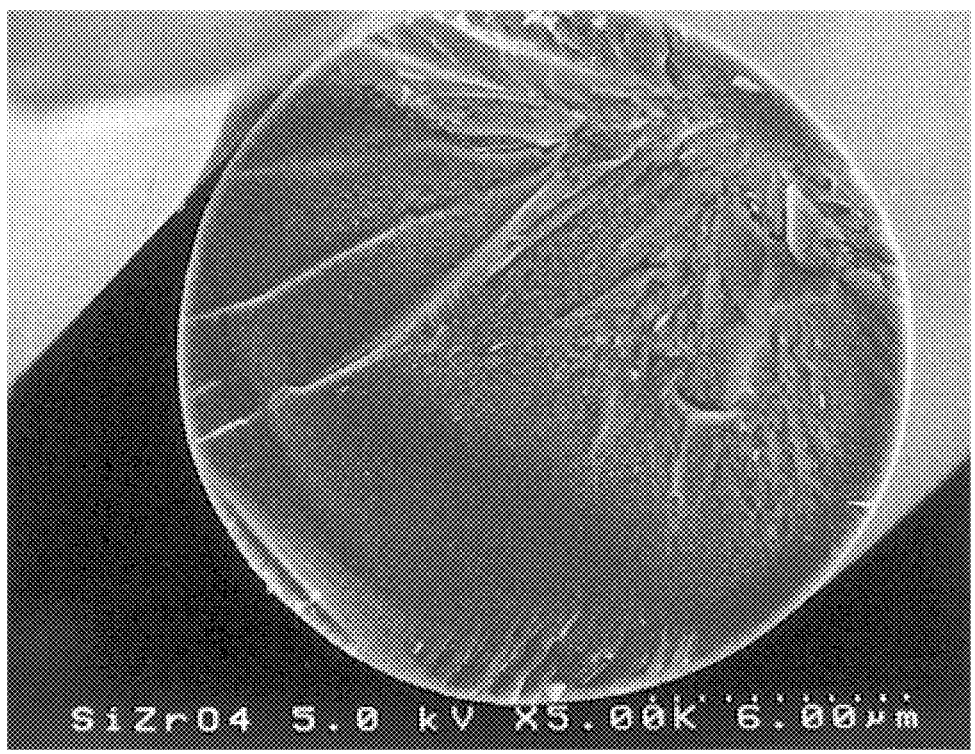
FIG. 1 shows a scanning electron micrograph showing a cross section of the fiber which was obtained in Example 2 of the present invention.

The oxide-containing organosilicon polymer of the present invention will be explained first hereinafter.

The oxide-containing organosilicon polymer of the present invention contains 1 to 45% by weight, preferably 5 to 35% by weight, more preferably 10 to 30% by weight, of metal oxide particles. When the content of the metal oxide particles is larger than the upper limit of the above range, the mechanical properties of an obtained inorganic fiber are impaired. When it is smaller than the lower limit of the above range, the oxidation resistance of a fiber is not improved.

The organosilicon polymer includes polycarbosilane, polysilane, polysiloxane, and the like, which are previously known. Further the above organosilicon polymer may contain a metal element such as boron, titanium, zirconium, aluminum, or the like.

The metal oxide is preferably a metal oxide having a high melting point. For example, the metal oxide is at least one metal oxide selected from oxides of Al, Ba, Be, Ca, Ce, Gd, Hf, La, Mg, B, Si, Sr, Th, V, Y, Zn, Pr, Nd, Sm, Eu, Tb, Dy, Ho, Er, Yb and Zr, and composite oxides of these.

The oxide-containing organosilicon polymer is produced by adding an alcohol solution of a metal oxide sol to an organosilicon polymer and heat-treating the mixture in an inert gas atmosphere.

The gas for constituting the inert atmosphere includes nitrogen and argon. The heating temperature is generally 200 to 300° C.

The oxide-containing silicon-carbide-based inorganic fiber of the present invention contains 1 to 45% by weight, preferably 5 to 35% by weight, more preferably 10 to 30% by weight, of metal oxide particles. The metal oxide particles may be present in a region close to the surface of the fiber in an amount lager than the amount thereof in the inside of the fiber. When the metal oxide particles in a relatively large amount are present, the mechanical properties of the fiber are not impaired. The presence of the metal oxide particles can improve the fiber in oxidation resistance. The thickness of a layer which is close to the surface and has a large content ratio of the metal oxide particles, is generally 0.1 to 3 μm.

The oxide-containing silicon-carbide-based inorganic fiber is produced by melt-spinning the above-described oxide-containing organosilicon polymer to form a spun fiber, infusibilizing the spun fiber to prepare an infusible fiber, and calcining the infusible fiber under heat.

The oxide-containing organosilicon polymer may be spun by a known method such as a melt spinning method or a dry spinning method.

Then, the spun fiber is infusibilized to form an infusible fiber.

The object of the infusibilization is to form crosslinking points of oxygen atoms among polymer chains constituting the spun fiber so that the infusible fiber is not melted and that adjacent fiber members are not fused to each other by a preliminary heating in the following step.

The gas for constituting an oxygen-containing atmosphere includes air, oxygen and ozone. The temperature for the infusibilization is 50 to 180° C. Although depending upon the infusibilization temperature, the infusibilization time is generally several minutes to 30 hours.

In the present invention, it is preferred to preliminarily heat the infusible fiber in an inert atmosphere before the calcining of the infusible fiber under heat.

The gas for constituting the inert atmosphere includes nitrogen, argon or the like. The heating temperature is generally 150 to 800° C. The heating time is several minutes to 20 hours. The preliminary heating of the infusible fiber in an inert atmosphere serves to proceed with the crosslinking reaction of the polymer constituting the fiber with preventing the capturing of oxygen into the fiber and serves to more improve the fiber in strength with retaining the excellent elongation of the infusible fiber. Owing to the above preliminary heating, the calcination in the final step may be effectively carried out with stability.

Thereafter, the infusible fiber or the preliminarily heated fiber is heat-treated by a continuous method or a batch method in an atmosphere containing an inert gas such as argon or a reducing gas such as hydrogen at a temperature in the range of from 1,000 to 1,700° C., to obtain an oxide-containing silicon-carbide-based inorganic fiber.

In the oxide-containing silicon-carbide-based inorganic fiber of the present invention, the metal oxide particles are dispersed in the fiber so that the oxide-containing silicon-carbide-based inorganic fiber shows almost no increase in weight by oxidation in an air at a temperature of 1,500° C. and it shows excellent oxidation resistance.

The crystalline silicon-carbide-based inorganic fiber of the present invention contains 1 to 45% by weight, preferably 1 to 30% by weight, more preferably 2 to 25% by weight, of the metal oxide.

The above crystalline silicon-carbide-based inorganic fiber is produced by heat-treating the above oxide-containing silicon-carbide-based inorganic fiber at a temperature in the range of 1,600 to 2,100° C. in an inert gas. The oxide-containing silicon-carbide-based inorganic fiber used for producing the crystalline silicon-carbide-based inorganic fiber preferably contains 8 to 16% by weight of oxygen other than oxygen contained in the metal oxide. The above oxygen serves to eliminate redundant carbon as CO in the heating of the oxide-containing silicon-carbide-based inorganic fiber in the following step.

The crystalline silicon-carbide-based inorganic fiber of the present invention contains the metal oxide in the fiber so that almost no increase in weight by oxydation is caused in a high temperature oxidizing atmosphere containing moisture and that it shows excellent oxidation resistance.

EXAMPLES

The present invention will be explained with reference to Examples and Comparative Example hereinafter, in which "part" and "%" stand for "part by weight" and "% by weight" unless otherwise specified.

Referential Example 1

1 liter of dimethyldichlorosilane was dropwise added to anhydrous xylene containing 400 g of sodium while the xylene was refluxed under heat under a flow of nitrogen gas, and the mixture was subsequently refluxed under heat for 10 hours to form a precipitate. The precipitate was recovered by filtration, and washed with methanol and then with water to give 420 g of a white polydimethylsilane.

750 g of diphenyldichlorosilane and 124 g of boric acid were heated in n-butyl ether at 100 to 120° C. in a nitrogen gas atmosphere, and the resultant white resinous substance was further heated under vacuum at 400° C. for 1 hour, to give 530 g of a phenyl-group-containing polyborosiloxane.

Referential Example 2

0.5 part of the phenyl-group-containing polyborosiloxane obtained in Referential Example 1 ?? was added to 100 parts of the polydimethylsilane obtained in Referential Example 1, and the mixture was thermally condensed in anitrogen gas atmosphere at 380° C. for 5 hours, to give an organosilicon polymer having high molecular weight.

Example 1

80 parts of an alcohol solution containing 20% of a commercially available zircon sol was added to 100 parts of the organosilicon polymer obtained in Referential Example 2, and the mixture was heated at 300° C. for 1 hour under a flow of nitrogen gas, to obtain an oxide-containing organosilicon polymer.

The above oxide-containing organosilicon polymer was spun at 205° C. to form a fiber, the fiber was heated in air at 150° C. for 5 hours, and then the resultant fiber was further heated in nitrogen at 290° C. for 10 hours, to obtain an infusible fiber. The infusible fiber was calcined in nitrogen at 1,400° C., to obtain a zircon-containing silicon-carbide-based fiber. The fiber had a tensile strength of 2.8 Gpa, an elastic modulus in tension of 155 GPa and an oxygen content of 21%.

The above zircon-containing silicon-carbide-based fiber was heat-treated in air at 1,300° C. for 1 hour. The heat-treated fiber had a tensile strength of 2.8 Gpa and an elastic modulus in tension of 154 GPa. There was found no increase in weight by oxidation.

Referential Example 3

5 parts of zirconium acetyl acetonate was added to a solution of 100 parts of the organosilicon polymer obtained in Referential Example 2 in xylene, and the mixture was allowed to react in a crosslinking reaction at 310° C. under a flow of a nitrogen gas, to obtain a polyzirconocarbosilane.

Example 2

100 parts of an alcohol solution containing 20% of a commercially available zircon sol was added to 100 parts of the polyzirconocarbosilane obtained in Referential Example 3, and the mixture was heated at 310° C. for 1 hour under a flow of a nitrogen gas, to obtain an oxide-containing organosilicon polymer.

The above polymer was spun at 220° C. to form a fiber, the fiber was heated in air at 160° C. for 5 hours, and then the resultant fiber was further heated in nitrogen at 295° C. for 10 hours, to obtain an infusible fiber. The infusible fiber was calcined in nitrogen at 1,500° C., to obtain a zircon-containing silicon-carbide-based fiber. The fiber had a tensile strength of 3.2 Gpa, an elastic modulus in tension of 160 GPa and an oxygen content of 17%.

Figure 2:
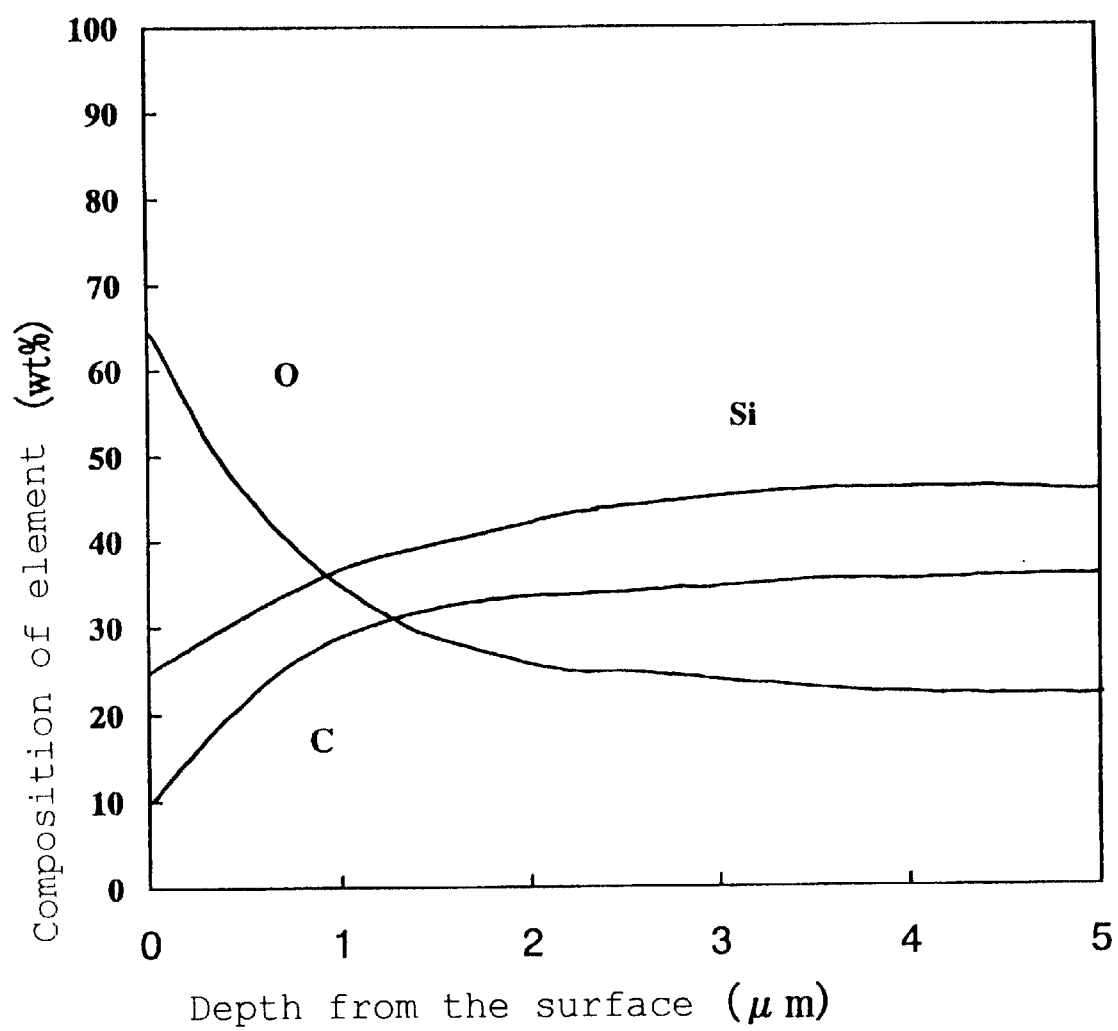
FIG. 2 shows a drawing showing results of analysis of the surface of the fiber obtained in Example 2 of the present invention by Auger.

The cross section of the fiber was observed with a scanning electron microscope, to find that the structure of a region of from the fiber surface to a depth of approximately 1 $\mu$m was different from the structure of other regions ??, as shown in FIG. 1. Further, the surface of the fiber was analyzed by Auger, and it was found that the content of oxygen was large in a region of from the surface to a depth of approximately 1 $\mu$m, as shown in FIG. 2.

The above fiber was heat-treated at 1,000° C. in air for 1,000 hours. The heat-treated fiber had a tensile strength of 3.2 GPa and an elastic modulus in tension of 160 GPa, that is, no changes were found. Further, there was found no increase in weight by oxidation.

Further, the above fiber was heated at 1,500° C. in air for 1 hour, and there was found no increase in weight by oxidation.

The above fiber was heat-treated in air containing 4% of water vapor at 1,300° C. for 1 hour. The heat-treated fiber had a tensile strength of 3.0 GPa and an elastic modulus in tension of 159 GPa, and the increase in weight by oxidation was 0.6%.

Comparative Example 1

The polyzirconocarbosilane obtained in Referential Example 3 was spun at 210° C. without adding a zircon sol to obtain a fiber, the fiber was heated in air at 160° C. for 5 hours, and the heated fiber was further heated in nitrogen at 295° C. for 10 hours to obtain an infusible fiber. The infusible fiber was calcined in nitrogen at 1,500° C. to obtain a zircon-containing silicon-carbide-based fiber. The zircon-containing silicon-carbide-based fiber had a tensile strength of 3.3 Gpa, an elastic modulus in tension of 190 Gpa, and an oxygen content of 10%.

The zircon-containing silicon-carbide-based fiber was heat-treated in air at 1,000° C. for 1,000 hours. The heat-treated fiber had a tensile strength of 2.4 Gpa and an elastic modulus in tension of 176 Gpa and the increase in weight by oxidation was 9.1%.

Further, the above fiber was heated in air at 1,500° C. for 1 hour and the increase in weight by oxidation was 3.6%.

When the above fiber was heat-treated in an air atmosphere containing 4% of water vapor at 1,300° C. for 1 hour, its fiber members were fused to each other by an oxidation film formed on the fiber surface so that it was impossible to measure mechanical properties thereof. Further, the increase in weight by oxidation was 2.2%.

Example 3

50 parts of an alcohol solution containing 20% of zirconia sol synthesized by the sol-gel method was added to 100 parts of the organosilicon polymer obtained in Referential Example 2, and the mixture was heated at 300° C. for 1 hour under a flow of a nitrogen gas, to obtain an oxide-containing organosilicon polymer.

The above polymer was spun at 230° C. to form a fiber, the fiber was heated in air at 160° C. for 5 hours, and then the resultant fiber was further heated at 290° C. for 10 hours, to obtain an infusible fiber.

The infusible fiber was calcined in nitrogen at 1,500° C., to obtain a zirconia-containing silicon-carbide-based fiber. The fiber had a tensile strength of 3.10 Gpa, an elastic modulus in tension of 162 GPa and an oxygen content of 10%.

The above fiber was heat-treated in air at 1,000° C. for 1,000 hours. The heat-treated fiber had a tensile strength of 3.1 GPa and an elastic modulus in tension of 162 GPa, so that no changes were found. Further, there was found no increase in weight by oxidation.

The above fiber was heat-treated in air containing 4% of water vapor at 1,300° C. for 1 hour. The increase in weight by oxidation was 0.9%.

Example 4

25 parts of an alcohol solution containing 20% of a commercially available alumina sol was added to 100 parts of the organosilicon polymer obtained in Referential Example 2, and the mixture was heated at 300° C. for 1 hour under a flow of a nitrogen gas, to obtain an oxide-containing organosilicon polymer.

The above polymer was spun at 230° C. to form a fiber, the fiber was heated in air at 160° C. for 5 hours, and then the resultant fiber was further heated in nitrogen at 290° C. for 10 hours, to obtain an infusible fiber. The infusible fiber was calcined in nitrogen at 1,500° C., to obtain an alumina-containing silicon-carbide-based fiber.

The above fiber was further calcined in argon at 1,800° C. for 1 hour to obtain a crystalline alumina-containing silicon-carbide-based fiber. The fiber had a tensile strength of 0.77 GPa, an elastic modulus in tension of 203 GPa, and an alumina content of 5%.

The above fiber was heat-treated in air containing 4% of water vapor at 1,000° C. for 100 hours. In this case, the increase in weight by oxidation was 10.7%.

Example 5

A crystalline alumina-containing silicon-carbide-based fiber was obtained in the same manner as in Example 3 except that 50 parts of an alcohol solution containing 20% of a commercially available alumina sol was added to 100 parts of the organosilicon polymer obtained in Referential Example 2.

The fiber had a tensile strength of 0.93 GPa, an elastic modulus in tension of 229 GPa, and an alumina content of 10%.

The above fiber was heat-treated in air containing 4% of water vapor at 1,000° C. for 100 hours. In this case, the increase in weight by oxidation was 3.3%.

Example 6

A crystalline alumina-containing silicon-carbide-based fiber was obtained in the same manner as in Example 3 except that 100 parts of an alcohol solution containing 20% of a commercially available alumina sol was added to 100 parts of the organosilicon polymer obtained in Referential Example 2.

The fiber had a tensile strength of 1.90 GPa, an elastic modulus in tension of 278 GPa, and an alumina content of 20%.

Figure 3:
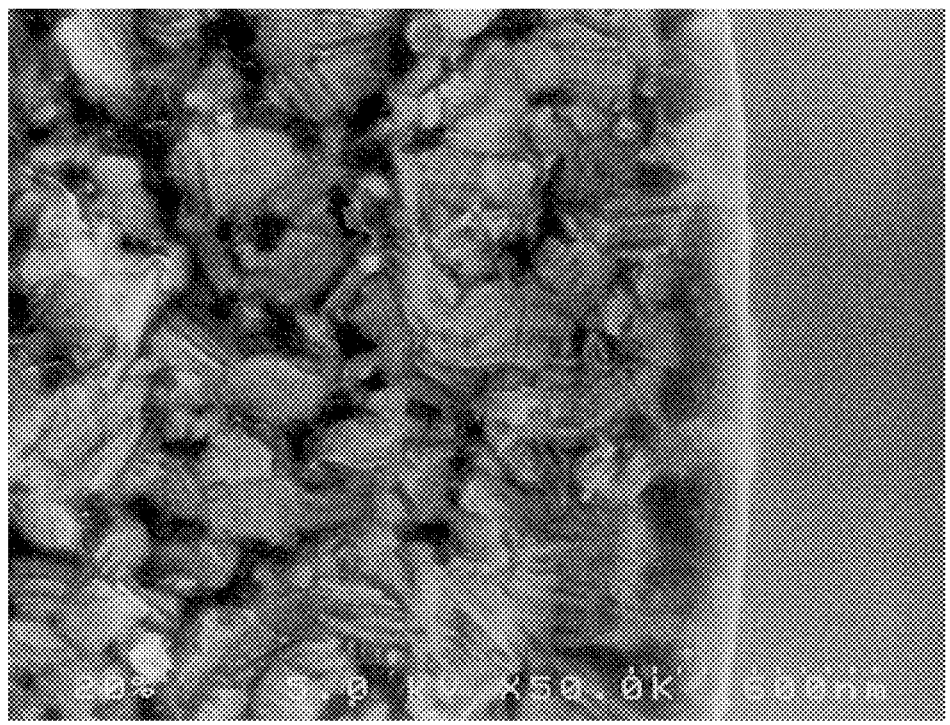
FIG. 3 shows a scanning electron micrograph showing a cross section of the fiber which was obtained in Example 6 of the present invention.

The cross section of the fiber was observed with a scanning electron microscope, and it was found that the fiber had a calcined structure of SiC, as shown in FIG. 3.

The above fiber was heat-treated in air containing 4% of water vapor at 1,000° C. for 100 hours. In this case, the increase in weight by oxidation was 2.0%.

Comparative Example 2

7 parts of aluminum tri(sec-butoxide) was added to a solution of 100 parts of the organosilicon polymer obtained in Referential Example 2 in xylene, and the mixture was allowed to react in a crosslinking reaction at 310° C. under a flow of a nitrogen gas, to obtain a polyaluminocarbosilane.

The polyaluminocarbosilane was melt-spun at 245° C., and the spun fiber was heated in air at 140° C. for 5 hours and further heated in nitrogen at 300° C. for 10 hours to obtain an infusible fiber. The infusible fiber was calcined in nitrogen at 1,500° C. to obtain a non-crystalline silicon-carbide-based fiber.

The non-crystalline silicon-carbide-based fiber was heat-treated in argon at 1,900° C. to obtain a crystalline silicon-carbide-based fiber.

The above fiber was heat-treated in air containing 4% of water vapor at 1,000° C. for 100 hours. In this case, the increase in weight by oxidation was 15.0%.

Example 7

50 parts of an alcohol solution containing 20% of an yttria sol synthesized by the sol-gel method was added to 100 parts of an organosilicon polymer, and the mixture was heated at 300° C. for 1 hour under a flow of a nitrogen gas, to obtain an oxide-containing organosilicon polymer. The above polymer was spun at 230° C. to form a fiber, the fiber was heated in air at 160° C. for 5 hours, and then the resultant fiber was further heated at 290° C. for 10 hours, to obtain an infusible fiber. The infusible fiber was calcined in nitrogen at 1,500° C., to obtain an yttria-containing silicon-carbide-based fiber. The above fiber was further calcined in argon at 1,800° C. for 1 hour to obtain a crystalline yttria-containing silicon-carbide-based fiber. The fiber had a tensile strength of 1.50 GPa and an elastic modulus in tension of 233 GPa.

The above fiber was heat-treated in air containing 4% of water vapor at 1,000° C. for 100 hours. In this case, the increase in weight by oxidation was 4.7%

Example 8

25 parts of an alcohol solution containing 20% of an yttria sol synthesized by the sol-gel method and 25 parts of an alcohol solution containing 20% of an alumina sol synthesized by the sol-gel method were added to 100 parts of an organosilicon polymer, and the mixture was heated at 300° C. for 1 hour under a flow of a nitrogen gas, to obtain an oxide-containing organosilicon polymer. The above polymer was spun at 230° C. to form a fiber, the fiber was heated in air at 160° C. for 5 hours, and then the resultant fiber was further heated at 290° C. for 10 hours, to obtain an infusible fiber. The infusible fiber was calcined in nitrogen at 1,500° C., to obtain an yttria/alumina-containing silicon-carbide-based fiber. The above fiber was further calcined in argon at 1,800° C. for 1 hour to obtain a crystalline yttria/alumina-containing silicon-carbide-based fiber. The fiber had a tensile strength of 1.90 GPa and an elastic modulus in tension of 275 GPa.

The above fiber was heat-treated in air containing 4% of water vapor at 1,000° C. for 100 hours. In this case, the increase in weight by oxidation was 2.7%.

Example 9

50 parts of an alcohol solution containing 20% of a magnesia sol synthesized by the sol-gel method was added to 100 parts of the organosilicon polymer obtained in Referential Example 2, and the mixture was heated at 300° C. for 1 hour under a flow of a nitrogen gas, to obtain an oxide-containing organosilicon polymer.

The above polymer was spun at 230° C. to form a fiber, the fiber was heated in air at 160° C. for 5 hours, and then the resultant fiber was further heated at 290° C. for 10 hours, to obtain an infusible fiber.

The infusible fiber was calcined in nitrogen at 1,500° C., to obtain a magnesia-containing silicon-carbide-based fiber. The above fiber was further calcined in argon at 1,800° C. for 1 hour to obtain a crystalline magnesia-containing silicon-carbide-based fiber. The fiber had a tensile strength of 1.30 GPa and an elastic modulus in tension of 225 GPa.

The above fiber was heat-treated in air containing 4% of water vapor at 1,000° C. for 100 hours. In this case, the increase in weight by oxidation was 5.9%.

What is claimed is:

1. An oxide-containing silicon-carbide-based inorganic fiber containing 1 to 45% by weight of metal oxide particles.

2. A silicon-carbide-based inorganic fiber according to claim 1, wherein the content ratio of the metal oxide in a region close to the surface of the fiber is higher than the content of the metal oxide in the inside of the fiber.

3. A silicon-carbide-based inorganic fiber according to claim 1, wherein the metal oxide is at least one metal oxide selected from the group consisting of oxides of Al, Ba, Be, Ca, Ce, Gd, Hf, La, Mg, B, Si, Sr, Th, V, Y, Zn, Pr, Nd, Sm, Eu, Tb, Dy, Ho, Er, Yb and Zr and composite oxides of these.

4. A production process of an oxide-containing organosilicon polymer, which process comprises adding an alcohol solution of a metal oxide sol to an organosilicon polymer and heat-treating the mixture in an inert gas atmosphere.

5. A production process of an oxide-containing silicon-carbide-based inorganic fiber, which process comprises adding an alcohol solution of a metal oxide sol to an organosilicon polymer, heat-treating the mixture in an inert gas atmosphere to obtain an oxide-containing organosilicon polymer, melt-spinning the oxide-containing organosilicon polymer to form a spun fiber, infusibilizing the spun fiber to obtain an infusible fiber, and calcining the infusible fiber under heat.

6. A crystalline silicon-carbide-based inorganic fiber containing 1 to 45% by weight of a metal oxide and having a calcined structure of SiC.

7. A crystalline silicon-carbide-based inorganic fiber according to claim 6, wherein the metal oxide is at least one metal oxide selected from the group consisting of oxides of Al, Ba, Be, Ca, Ce, Gd, Hf, La, Mg, B, Si, Sr, Th, V, Y, Zn, Pr, Nd, Sm, Eu, Tb, Dy, Ho, Er, Yb and Zr and composite oxides of these.

8. A production process of a crystalline silicon-carbide-based inorganic fiber containing 1 to 45% by weight of a metal oxide and having a calcined structure of SiC, which process comprises adding an alcohol solution of a metal oxide sol to an organosilicon polymer, heat-treating the mixture in an inert gas atmosphere to obtain an oxide-containing organosilicon polymer, spinning the oxide-containing organosilicon polymer to form a spun fiber, infusibilizing the spun fiber to obtain an infusible fiber, calcining the infusible fiber under heat to obtain an oxide-containing silicon-carbide-based inorganic fiber, and heat-treating the oxide-containing silicon-carbide-based inorganic fiber at a temperature of from 1,600 to 2,100° C. in an inert gas.

* * * * *